United States Patent [19]

McCord

[11] Patent Number: 4,463,575

[45] Date of Patent: Aug. 7, 1984

[54] VAPOR GENERATING AND RECOVERY APPARATUS INCLUDING A REFRIGERANT SYSTEM WITH REFRIGERANT HEAT REMOVAL MEANS

[76] Inventor: James W. McCord, 9101 Nottingham Pkwy., Louisville, Ky. 40222

[21] Appl. No.: 425,165

[22] Filed: Sep. 28, 1982

[51] Int. Cl.³ .................. F25B 39/04; B01D 3/42
[52] U.S. Cl. ..................... 62/184; 62/196.4; 62/238.5; 62/DIG. 17; 202/160; 203/DIG. 4
[58] Field of Search ............. 62/238.5, 238.6, 238.7, 62/181, 183, 184, 428, 429, 196.4, DIG. 17; 237/2 B; 202/160, 206; 203/DIG. 4

[56] References Cited

U.S. PATENT DOCUMENTS 4,003,798  1/1977  McCord ................. 203/DIG. 4
4,373,346  2/1983  Hebert et al. ............. 62/238.6

Primary Examiner—Harry Tanner
Attorney, Agent, or Firm—Charles G. Lamb

[57] ABSTRACT

A vapor generating and recovery apparatus for vaporizing a liquid and condensing the vapor including at least one chamber in which vapor is generated from the liquid and recovering the vapor in liquid form, the vapor generating portion of the chamber being in heat emitting relation with a heat emitting means and the vapor recovery portion of the chamber being in heat absorbing relation with a heat absorbing means. A preferred system for providing heating and cooling to the vapor generating and recovery apparatus is a refrigerant system which includes at least one refrigerant condensing coil (heat emitting means) and at least one refrigerant evaporating coil (heat absorbing means) in heat transfer relationship with the vapor generating portion and vapor recovery portion, respectively, of the chamber, and two refrigerant heat exchanger means, one being downstream and one being upstream of the heat emitting means for removing excess heat from the refrigerant system.

12 Claims, 5 Drawing Figures

VAPOR GENERATING AND RECOVERY APPARATUS INCLUDING A REFRIGERANT SYSTEM WITH REFRIGERANT HEAT REMOVAL MEANS

BACKGROUND OF THE INVENTION

The invention relates to a vapor generating and recovery apparatus for vaporizing a liquid and condensing a vapor, and more particularly to an improved apparatus for vaporizing a liquid and condensing a vapor in combination with a heating and cooling system.

Vapor generating and recovery devices for vaporizing and condensing a liquid have many uses such as cleaning, coating or otherwise surface treating objects. For example, in the cleaning of objects such as metallic tools, plastic parts and the like, hot boiling solvents are used to remove undesirable solubles and particulate matter by immersing the soiled objects into the hot or boiling solvent. In bringing the solvent to a boiling temperature, a solvent vapor zone is created above the boiling solvent solution in a chamber of the device containing the solvent in which the objects are immersed. The vaporized solvent is recovered by cooling the vapor to a temperature below the vaporizing temperature of the liquid.

It is known to use a refrigerant system as the means for heating or boiling the liquid and condensing vapor. For example, U.S. Pat. No. 4,003,798 describes one such refrigerant system which includes a refrigerant condenser disposed within the chamber for heating and boiling the liquid, and a refrigerant evaporating coil disposed within the chamber for condensing the vapor.

In the heating and cooling refrigerant system it sometimes occurs that more energy is available to the system as heat, due to the refrigerant compressor motor input energy and motor inefficiencies and high ambient temperatures than is needed to efficiently vaporize and condense a particular liquid, and this excess heat adversely effects efficient condensation of the liquid in the at least one chamber.

SUMMARY OF THE INVENTION

The present invention recognizes the occurrences and causes of the operating conditions which adversely effects efficient vapor recovery by condensation of the liquid in a vapor generating and recovery apparatus having a refrigerant system as the means for heating the treating liquid and recovering the vapor.

It has been found that in some instances in the utilization of a refrigeration system for both vaporizing a liquid and condensing the vaporized liquid in a vapor generating and recovery apparatus, the excess heat developed during the running of the compressor in the system has to be removed. Generally, a heat exchanger is disposed downstream of the heating coil in the system to remove this excess heat. The means for removing this excess heat is usually cooling water or air. However, in some applications the temperature of the cooling water or air is so high that it is not sufficiently capable of removing the amount of heat necessary to provide an efficient heat transfer. Thus, it has now been found that in environments where the cooling water or air is relatively warm, a second heat exchanger means may be incorporated to remove some of this excess heat from the refrigerant system at its higher temperature level upstream of the heating coil as well as at its lower temperature level downstream of the heating coil.

More particularly, the present invention comprises in a vapor generating and recovery apparatus for vaporizing a liquid and condensing a vapor, including at least one chamber for containing the liquid and vapor, a heating and cooling system in heat transfer relation with the liquid and the vapor in the at least one chamber, the heating and cooling system including a refrigerant condensing coil in heat emitting relationship with the liquid, a refrigerant evaporator coil in heat absorbing relationship with the vapor and a refrigerant compressor having the high pressure side in refrigerant flow communication with the condensing coil and the low pressure side in refrigerant flow communication with the evaporator coil, the improvement comprising first heat exchange means for removing heat from the refrigerant flowing from the refrigerant condensing coil, second heat exchange means for removing heat from the refrigerant flowing from the compressor, and means for activating the first and second heat exchange means for maintaining a predetermined heat absorbing relationship between the refrigerant evaporator coil and the vapor.

It is to be understood that the description of the examples of the present invention given hereinafter are not by way of limitation and various modifications within the scope of the present invention will occur to those skilled in the art upon reading the disclosure set forth hereinafter.

BRIEF DESCRIPTION OF THE DRAWINGS

Referring to the drawings.

DESCRIPTION OF THE PREFERRED EMBODIMENTS

Figure 1:
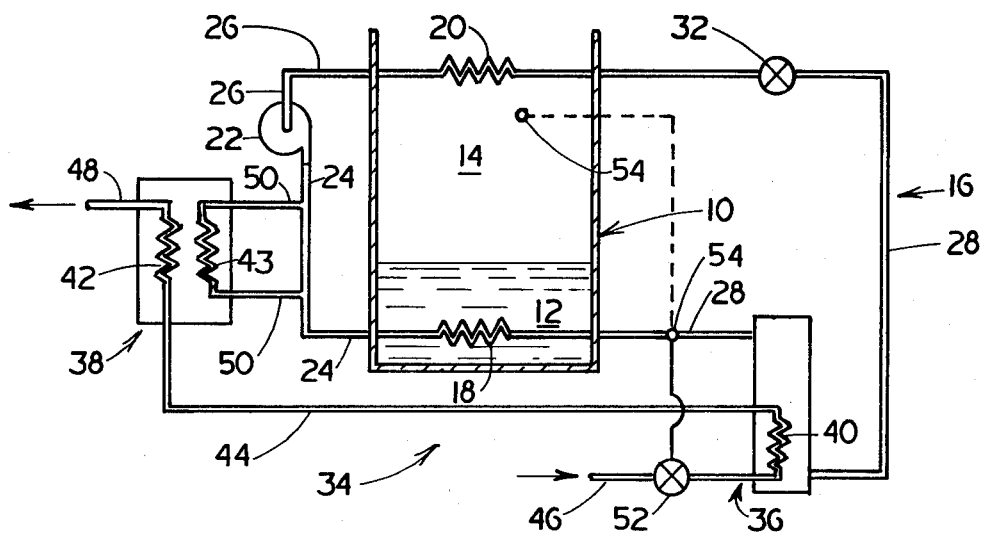
FIG. 1 is a schematic diagram of a vapor generating and recovery apparatus of the present invention.

FIG. 1 depicts a vapor generating and recovery apparatus of the present invention having at least one chamber 10 in which a liquid 12 is vaporized and then the vapor is condensed back to a liquid in a vapor zone 14 of the chamber 10 above the liquid level.

The heating and cooling system for vaporizing the liquid and condensing the vapor is a refrigerant system, generally denoted as the numeral 16. The refrigerant system comprises a heating coil 18 disposed within the liquid 12 and near the bottom of the chamber 10 which provides heat to vaporize the liquid 12, and a cooling coil 20 disposed within the vapor zone 14 of the chamber 10 for absorbing heat from the vapor in the vapor zone 14 to maintain a preselected temperature in the vapor zone below the vaporizing temperature of the liquid 12. The heating coil 18 is a refrigerant evaporating coil of the refrigerant system 16.

The heating and cooling refrigerant system 16 of FIG. 1 further comprises a refrigerant compressor 22 which has its high pressure side in refrigerant flow communication with the heating coil 18 by refrigerant conduit means 24 and has its low pressure side in refrigerant flow communication with the cooling coil 20 by refrigerant conduit means 26. The downstream side of the heating coil 18 is shown as being in refrigerant flow communication with the upstream side of the cooling coil 20 by refrigerant conduit means 28. The refrigerant system is also shown as including a suitable refrigerant heat exchanger 36 disposed in the refrigerant conduit means 28 and a suitable refrigerant expansion valve 32 also disposed in the refrigerant conduit means 28 between the heater exchanger 36 and cooling coil 20.

With continued reference to FIG. 1, the refrigerant system 16 includes means, generally denoted as the number 34, for removing excess heat from the refrigerant before the refrigerant reaches the cooling coil 20. As shown, the excess heat removing means 34 comprises the first heat exchange means 36 located downstream of the heating coil 18 for removing heat from the refrigerant flowing out of the heating coil 18, and a second heat exchange means 38 located downstream of the compressor 22 and upstream of the heating coil 18 to remove more heat from at least a portion of the refrigerant flowing from the compressor to the heating coil 18. As depicted, the first heat exchange means 36 comprises a heat exchange coil 40 located in heat exchange relationship to the refrigerant within the heat exchanger 36, and the second heat exchange means 38 comprises a heat exchange coil 42 located in heat exchange relationship to at least a portion of the refrigerant flowing to the heating coil 18 from the compressor 22. The heat exchange coil 40 of the first heat exchange means 36 is in series heat exchange flow communication with the heat exchange coil 42 of the second heat exchange means by, for example, a conduit 44 connecting the outlet from the heat exchange coil 40 to the inlet to the heat exchange coil 42. The heat exchange media, for example water, is supplied to the inlet to the heat exchange coil 40 from a water source (not shown) through supply conduit 46, and is returned from the outlet from the heat exchange coil 42 to the water source through return conduit 48. A portion of the refrigerant flowing from the compressor 22 is diverted from the refrigerant conduit 24 upstream of the heating coil 18 to pass through the second heat exchange means 38. After passing through the second heat exchange means 38, the refrigerant is returned to the conduit 24 upstream of the heating coil 18. This is accomplished by, for example, conduit 50 which is in flow communication with the conduit 24 both upstream and downstream of the second heat exchange means 38 and passes in heat exchange relationship to the heat exchange coil 42 through the second heat exchange means 38.

When the temperature of the refrigerant flowing from the heating coil 18 to the cooling coil 20 becomes too hot to efficiently cool the vapor in the vapor zone 14 of the chamber 10, thus allowing some vapor to escape from the chamber, the heat exchange media, for example water, is allowed to flow, in series, first through the heat exchange coil 40 of the first heat exchange means 36 and next through the heat exchange coil 42 of the second heat exchange means 38 by means of conduit 44. Toward this end, a flow control valve 52 is located in the water supply conduit 46 between the water source and heat exchange coil 40. The flow control valve 52 is activated to control the flow of heat exchange media (water) to the heat exchange coil 40 by means of, for example, a temperature sensor 54. As shown in solid lines in FIG. 1, the temperature sensor 54 can be used to sense the temperature of the refrigerant flowing from the heating coil 18. When the temperature of the refrigerant reaches a predetermined temperature too high to efficiently condense the vapor in the vaporizing chamber 14, the sensor actuates to open the flow control valve 52 allowing water to flow through the first and second heat exchange means 36 and 38 cooling the refrigerant to the proper preselected temperature. When the preselected refrigerant temperature is reached, the sensor 54 actuates to close the flow control valve 52. it is also contemplated that the temperature sensor 54 could be located, as indicated by dashed lines in FIG. 1, in the vapor zone 14 of the chamber 10 to sense the actual temperature of the vapor and activate the flow control valve 52 accordingly as discussed above. Furthermore, pressure sensing means may be utilized in place of the shown temperature sensing means without departing from the scope and spirit of this invention.

Figure 2:
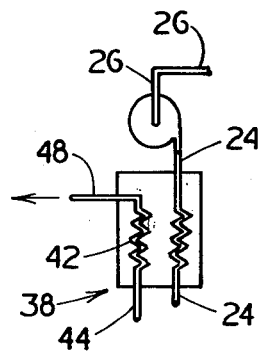
FIG. 2 is a schematic diagram showing one modification of the apparatus of FIG. 1.

FIG. 2 shows a somewhat modified second heat exchange means, denoted as the number 138, which is similar in virtually every respect to the second heat exchange means 38 of FIG. 1, except that the entire refrigerant flow from the compressor 22 through the conduit 24 to the heating coil 18 passes in heat exchange relationship to the heat exchange coil 42.

Figure 3:
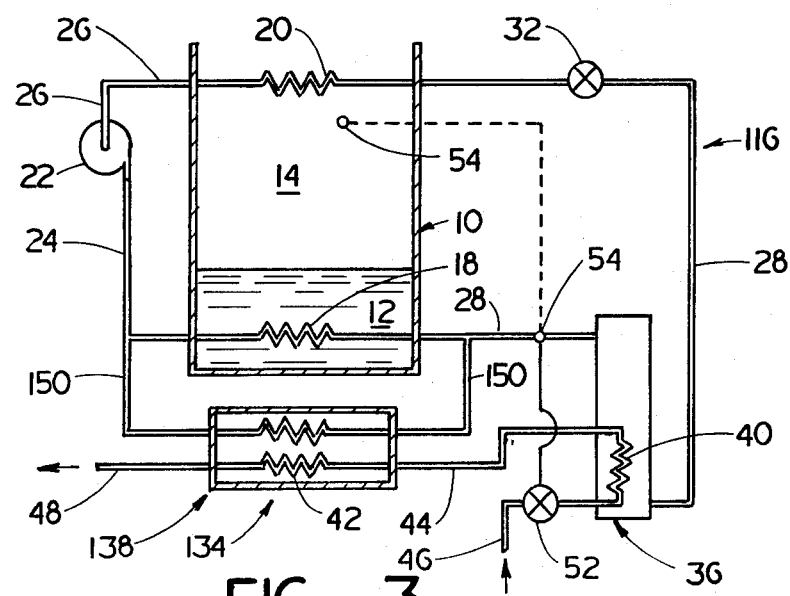
FIG. 3 is a schematic diagram of another vapor generating and recovery apparatus of the present invention.

Now with reference to FIG. 3, there is illustrated another advantageous embodiment of a vapor generating and recovery apparatus of the present invention having the at least one chamber 10 and a refrigerant system, generally denoted as the number 116, for vaporizing and condensing the vapor. As with the refrigerant system 16 of FIG. 1, the refrigerant system 116 comprises the heating coil 18 disposed within the liquid 12 and near the bottom of the chamber 10, the cooling coil 20 disposed within the vapor zone 14, and, the compressor 22 in refrigerant flow communication with the heating coil 18 by means of conduit 24 and in refrigerant flow communication with the cooling coil 20 by means of conduit 26. The conduit 28 provides refrigerant flow communication from the heating coil 18 to the cooling coil 20, with the heat exchanger 36 and expansion valve 32 being in the conduit 28.

The refrigerant system 116 further includes means, generally denoted as the number 134, for removing excess heat from the refrigerant before the refrigerant reaches the cooling coil 20. The heat removing means 134 comprises the first heat exchange means 36 located downstream of the heating coil 18 and a second heat exchange means 138 located in parallel refrigerant flow relationship to the heating coil 18. A portion of the refrigerant flowing from the compressor 22 is diverted from the refrigerant conduit 24 upstream of the heating coil 18 to pass through the second heat exchange means 138. After passing through the second heat exchange means 138 the refrigerant is returned to the refrigerant conduit 28 downstream of the heating coil 18 but upstream of the heat exchanger 36. Toward this end, conduit 150 is provided which is in flow communication with the conduit 24 upstream of the heating coil 18 and in flow communication with the conduit 26 downstream of the heating coil 18 and passes in heat exchange relationship to the heat exchange coil 42 through the second heat exchange means 138. The heat removing means 134 also includes the flow control valve 52 and sensor 54 as discussed above.

Figure 4:
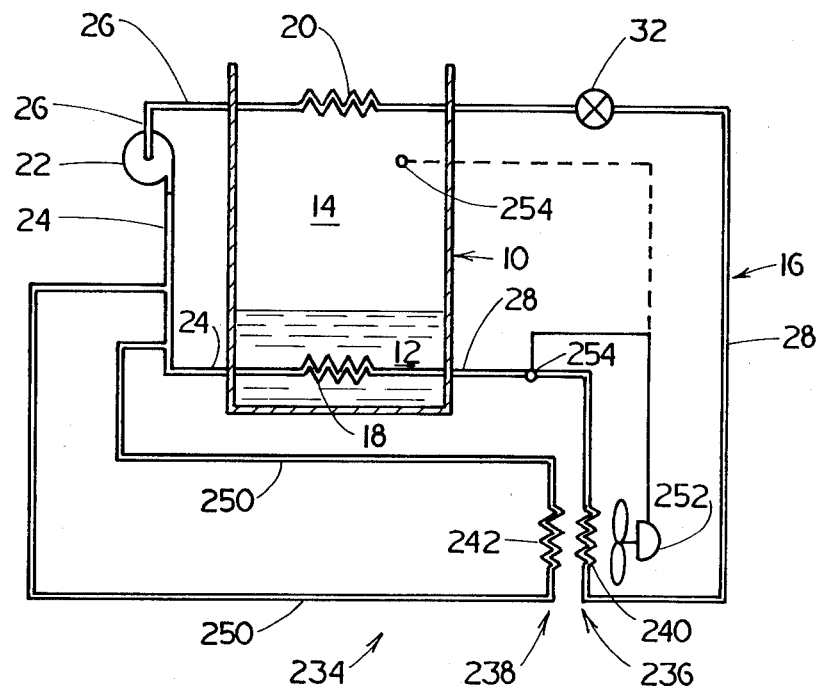
FIG. 4 is a schematic diagram of yet another vapor generating and recovery apparatus of the present invention; and, FIG. 5 is a schematic diagram of a further vapor generating and recovery apparatus of the present invention.

FIG. 4 depicts another advantageous vapor generating apparatus virtually identical in every respect to the apparatus of FIG. 1, except for the heat removing means, here depicted by the number 234. In this embodiment, the excess heat removing means 234 comprises a first heat exchange means 236 located downstream of the heating coil 18 and a second heat exchange means 238 located upstream of the heating coil 18. The first heat exchange means 236 includes a coil 240 located in refrigerant flow communication in the conduit 28, and the second heat exchange means 238 includes a coil 242 in refrigerant flow communication with the refrigerant conduit 24 by means of conduit 250. The conduit 250 receives refrigerant from the conduit 24 and returns the refrigerant back to the conduit 24 upstream of the heating coil 18 after the refrigerant has passed through the coil 242. The coil 240 of the first heat exchange means 236 is located adjacent to the coil 242 of the second heat exchange means 238. The first and second heat exchange means further includes a common cooling air moving means, such as, for example, a fan or blower 252 located to move cooling air first over the coil 240 and then over the coil 242. The activation of the fan 252 is controlled by the sensor 254 which can be located to sense the temperature or pressure of the refrigerant flowing in conduit 28 from the heating coil 18 (as shown in solid lines), or it can be located in the vapor zone 14 of the chamber 10 to sense the temperature or pressure of the vapor in the vapor chamber 14 (as shown in dashed lines).

Figure 5:
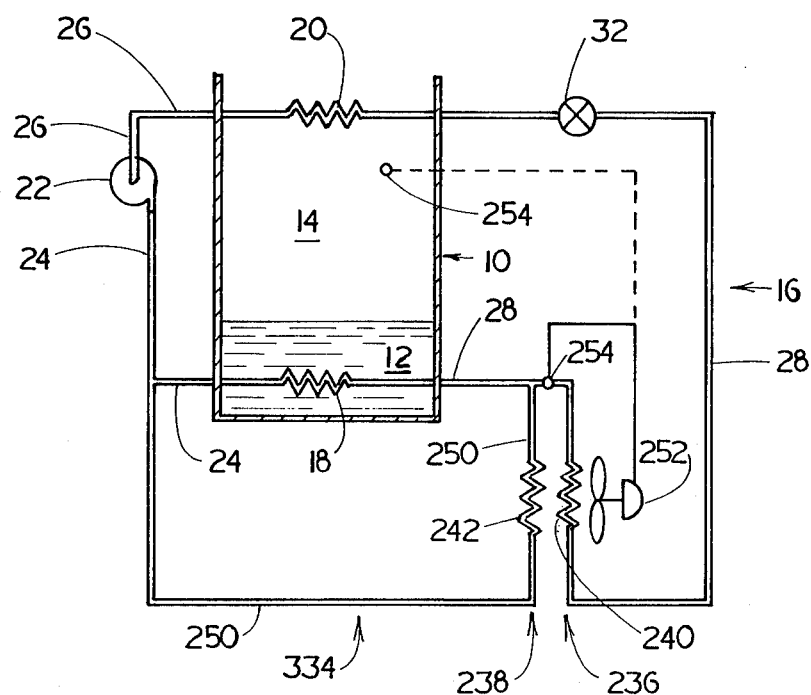

FIG. 5 shows a somewhat modified version of the excess heat removing means of FIG. 4, which is generally indicated as the number 334 in FIG. 5, the only difference being that instead of being in refrigerant flow series with the heating coil 18 as in FIG. 4, the coil 242 of the second heat exchange means 238 is in parallel refrigerant flow with the heating coil 240. Toward this end, conduit 250 is in refrigerant communication with the conduit 24 upstream of the heating coil 18 for receiving refrigerant from the conduit 24 and in refrigerant communication with the conduit 28 downstream of the heating coil 18 and upstream of the coil 240 for returning the refrigerant to the conduit 28 after the refrigerant has passed through the coil 242.

It will be realized that various changes may be made to the specific embodiments shown and described without departing from the principles and spirit of the present invention.

What is claimed is:

1. In a vapor generating and recovery apparatus for vaporizing a liquid and condensing a vapor, including at least one chamber for containing the liquid and vapor, a heating and cooling system in heat transfer relation with the liquid and the vapor in the at least one chamber, the heating and cooling system including a refrigerant condensing coil in heat emitting relationship with the liquid, a refrigerant evaporator coil in heat absorbing relationship with the vapor and a refrigerant compressor having the high pressure side in refrigerant flow communication with the condensing coil and the low pressure side in refrigerant flow communication with the evaporator coil, the improvement comprising:

a first heat exchange means for removing heat from the refrigerant flowing from the refrigerant condensing coil;

a second heat exchange means for removing heat from a preselected amount of the refrigerant flowing from the compressor; and, means to by-pass a portion of said refrigerant around said second heat exchange means; and, means for activating the first and second heat exchange means for maintaining a predetermined heat absorbing relationship between the refrigerant evaporator coil and the vapor.

2. In the vapor generating and recovering apparatus of claim 1, said second heat exchange means being in refrigerant flow series relationship with the refrigerant condensing coil.

3. In the vapor generating and recovering apparatus of claim 1, said second heat exchange means being in parallel refrigerant flow relationship with the refrigerant condensing coil.

4. In the vapor generating and recovery apparatus of claim 1, said first and second heat exchange means being liquid cooled.

5. In the vapor generating and recovery apparatus of claim 4, wherein said first and second heat exchange means are in cooling liquid series relationship to each other.

6. In the vapor generating and recovery apparatus of claim 4, said activating means includes means for controlling the flow of cooling liquid through said first and second heat exchange means.

7. In the vapor generating and recovery apparatus of claim 1, said first and second heat exchange means being air cooled.

8. In the vapor generating and recovery apparatus of claim 1, said activating means includes sensing means for sensing a preselected condition of the refrigerant.

9. In the vapor generating and recovery apparatus of claim 1, said activating means includes sensing means for sensing a predetermined condition of the vapor.

10. In the vapor generating and recovery apparatus of claims 8 or 9, said sensing means being a temperature sensing means and said condition being temperature.

11. In the vapor generating and recovery apparatus of claims 8 or 9, said sensing means being a pressure sensing means and said condition being pressure.

12. In the vapor generating and recovery apparatus of claim 7, said activating means includes means for controlling the flow of cooling air.

* * * * *